United States Patent
Min et al.

(10) Patent No.: US 11,989,230 B2
(45) Date of Patent: *May 21, 2024

(54) MEDIA SEARCH FILTERING MECHANISM FOR SEARCH ENGINE

(71) Applicant: Comcast Cable Communications, LLC, Philadelphia, PA (US)

(72) Inventors: Rui Min, Vienna, VA (US); Hongcheng Wang, Arlington, VA (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 346 days.

This patent is subject to a terminal disclaimer.

(21) Appl. No.: 17/445,865

(22) Filed: Aug. 25, 2021

(65) Prior Publication Data

US 2021/0382939 A1    Dec. 9, 2021

Related U.S. Application Data

(63) Continuation of application No. 15/864,282, filed on Jan. 8, 2018, now Pat. No. 11,106,729.

(51) Int. Cl.
*G10L 15/22* (2006.01)
*G06F 16/683* (2019.01)
(Continued)

(52) U.S. Cl.
CPC ........ *G06F 16/683* (2019.01); *G06F 16/9535* (2019.01); *G10L 15/08* (2013.01);
(Continued)

(58) Field of Classification Search
None
See application file for complete search history.

(56) References Cited

U.S. PATENT DOCUMENTS 6,366,882 B1    4/2002    Bijl et al.
6,785,654 B2    8/2004    Cyr et al.
(Continued)

FOREIGN PATENT DOCUMENTS

CN    104866274 A    8/2015

OTHER PUBLICATIONS

US Patent Application filed Mar. 16, 2023, entitled "Guidance Query for Cache System", U.S. Appl. No. 18/184,783.
(Continued)

*Primary Examiner* — Neeraj Sharma
(74) *Attorney, Agent, or Firm* — BakerHostetler (57) ABSTRACT

Methods and systems for more efficient analyses of and response to voice commands and queries are provided. The system may be configured to receive one or more of audio files corresponding to a voice query and determine, for each of the audio files, whether the audio file is a first type of audio file capable of being processed based on a characteristic of the audio file or a second type of audio file that cannot, and may require further processing in order to recognize the voice query associated with the audio file. The system may process each of the first type of audio files and respond to the associated voice queries. The system may also determine a priority for each of the second type of audio files for further processing of the second type of audio files.

36 Claims, 6 Drawing Sheets

(51) Int. Cl.
*G06F 16/9535* (2019.01)
*G10L 15/08* (2006.01)
*G10L 15/30* (2013.01)
*G10L 19/018* (2013.01)
*G10L 25/54* (2013.01)
*G10L 25/69* (2013.01)
*G06Q 30/0202* (2023.01)
*H04L 9/40* (2022.01)

(52) U.S. Cl.
CPC .............. *G10L 15/22* (2013.01); *G10L 15/30* (2013.01); *G10L 19/018* (2013.01); *G10L 25/54* (2013.01); *G10L 25/69* (2013.01); *G06Q 30/0202* (2013.01); *G10L 2015/085* (2013.01); *H04L 63/1458* (2013.01)

(56) References Cited

U.S. PATENT DOCUMENTS

| | | | |
|---|---|---|---|
| 8,971,543 | B1 | 3/2015 | List |
| 9,070,367 | B1 | 6/2015 | Hoffmeister et al. |
| 9,536,151 | B1 | 1/2017 | Postelnicu et al. |
| 9,871,606 | B1 | 1/2018 | Carroll et al. |
| 10,067,934 | B1* | 9/2018 | Tran ................... H04N 21/4828 |
| 2003/0061036 | A1 | 3/2003 | Garudadri et al. |
| 2003/0065655 | A1* | 4/2003 | Syeda-Mahmood .. G09B 5/067 |
| 2003/0081744 | A1 | 5/2003 | Gurfein et al. |
| 2004/0010409 | A1 | 1/2004 | Ushida et al. |
| 2005/0201254 | A1 | 9/2005 | Looney et al. |
| 2007/0247979 | A1 | 10/2007 | Brillon et al. |
| 2008/0086379 | A1 | 4/2008 | Dion et al. |
| 2008/0109285 | A1 | 5/2008 | Reuther et al. |
| 2009/0138109 | A1 | 5/2009 | Park |
| 2009/0307368 | A1 | 12/2009 | Sriram et al. |
| 2012/0089392 | A1 | 4/2012 | Larco et al. |
| 2013/0070093 | A1 | 3/2013 | Rivera et al. |
| 2014/0074846 | A1 | 3/2014 | Moss et al. |
| 2014/0195557 | A1 | 7/2014 | Oztaskent et al. |
| 2014/0277638 | A1 | 9/2014 | Smith |
| 2014/0380379 | A1 | 12/2014 | Klappert et al. |
| 2015/0025663 | A1 | 1/2015 | Cameron et al. |
| 2015/0161990 | A1 | 6/2015 | Sharifi |
| 2015/0169682 | A1 | 6/2015 | Toshev |
| 2015/0331939 | A1 | 11/2015 | Burgmeier et al. |
| 2016/0085800 | A1* | 3/2016 | Pujari ................ G06F 16/2423 707/765 |
| 2016/0085846 | A1 | 3/2016 | Smith |
| 2016/0119713 | A1* | 4/2016 | Knox .................. G06V 20/593 381/71.1 |
| 2017/0013314 | A1 | 1/2017 | Mallinson |
| 2017/0078737 | A1* | 3/2017 | Jagt ..................... H04N 21/482 |
| 2017/0249664 | A1 | 8/2017 | Harik et al. |
| 2018/0061421 | A1 | 3/2018 | Sarikaya |
| 2018/0277132 | A1* | 9/2018 | LeVoit ................... G10L 15/26 |
| 2019/0182072 | A1* | 6/2019 | Roe ..................... H04L 12/2829 |
| 2019/0206396 | A1 | 7/2019 | Chen |
| 2020/0234720 | A1* | 7/2020 | Sung .................... G06N 20/00 |
| 2021/0193167 | A1 | 6/2021 | Jiang |

OTHER PUBLICATIONS

US Patent Application filed Oct. 21, 2019, entitled "Guidance Query for Cache System", U.S. Appl. No. 16/659,262.

* cited by examiner

MEDIA SEARCH FILTERING MECHANISM FOR SEARCH ENGINE

CROSS REFERENCE TO RELATED APPLICATIONS

This application is a continuation of U.S. patent application Ser. No. 15/864,282, filed Jan. 8, 2018, now U.S. Pat. No. 11,106,729, which is hereby incorporated by reference in its entirety.

BACKGROUND

Speech recognition engines may be used to provide speech-based services for television and other areas, for example, by allowing users to control their cable set-top boxes by speaking into their cellular telephones or into the hand-held remote control of the cable set-top box. Speech recognition engines provide a number of advantages over traditional set-top box remote or web interfaces by eliminating the need for typing or other keyboard-based or remote-based entry methods, such as TV or cable remotes. However, the capacity of a speech recognition engine may be limited as the recognition process may be very CPU and memory intensive. Occasionally, when special events happen, or when a distributed denial of service (DDoS) attack occurs, in a short period of time the amount of queries to the speech recognition engine can greatly exceed the system limit. When this occurs, the speech recognition engine may crash.

SUMMARY

Methods and systems are provided herein for filtering audio files to improve the efficiency of a speech recognition engine. A query filter may be provided to receive a plurality of audio files, each of the plurality of audio files corresponding to a voice query. A voice query may be, for example, a spoken command to the user device to perform some action, a spoken request to view or play some particular content, a spoken request to search for certain content or information based on search criteria, or any other spoken request or command that may be uttered by a user of the user device. The query filter may determine, for each of the plurality of audio files, whether the audio file is a first type of audio file or a second type of audio file. A first type of audio file may be capable of being processed to recognize the voice query based on a characteristic of the audio file itself (i.e., without the need for speech recognition). In contrast, a second type of audio file may require speech recognition processing in order to recognize the voice query associated with the audio file. The query filter may process each of the first type of audio files and determine a priority for each of the second type of audio files. The query filter may be further configured to send, to a server capable of performing speech recognition processing, one or more of the second type of audio files based on the determined priority of the audio file.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems for filtering audio files to improve the efficiency of a speech recognition engine and to prevent failures at the speech recognition engine are provided herein. One method of preventing speech recognition engine failure may be to allocate more hardware and operational resources to accommodate an unexpected spike in requests. However, this solution may be very expensive, and as the request spikes happen only occasionally, the extra resources will not be utilized for the majority of speech recognition processing. In addition, even if additional hardware and operational resources are employed during normal system capacity, the extra resources will provide little assistance in the event of an unexpected hardware or network failure. For example, if the network connection to one speech recognition service module in one data center is down, no matter how many additional resources are employed in that specific data center, no request may be able to be processed. Further, traffic volume and service spikes are often difficult to predict. Doubling the amount of resources may not be enough to help in many service spike scenarios, and a ten-fold increase in resources may lead to a large waste of available resources during non-peak times.

A second method for preventing speech recognition engine failure may be to employ a filter that randomly drops queries that are beyond the engine capacity. For example, if a single speech recognition service stack can handle one hundred queries per second, and the actual query volume is five hundred queries per second, four hundred queries may be randomly dropped each second. Thus, only 20% of the users of the speech recognition engine may receive results to their voice queries. While this solution is better than allowing the system to crash and 0% of the users to receive results, it is not an ideal solution. What is needed is a filter that is capable of managing and selectively processing queries based on one or more characteristics of the individual queries.

Disclosed herein is a query filter for selectively filtering audio files representing voice queries to improve the efficiency of a speech recognition engine. The query filter may be configured to receive a plurality of audio files, each of the plurality of audio files corresponding to a voice query. The query filter may determine, for each of the plurality of audio files, whether the audio file is a first type of audio file or a second type of audio file. A first type of audio file may be capable of being processed to recognize the voice query based on a characteristic of the audio file. For example, the audio file may be capable of being processed based on an audio fingerprint that represents certain characteristics of the audio file audio file. An example first type of audio file may comprise the voice query "tune to CNBC." This type of voice query may be spoken very similarly by a variety of users. Thus, it may be possible to recognize that audio file as the utterance "tune to CNBC" simply from acoustics characteristics of the audio file—without needed speech recognition.

In contrast, a second type of audio file may require speech recognition processing in order to recognize the voice query associated with the audio file. The query filter may be configured to process (i.e., recognize the voice query) each of the first type of audio files based on the characteristics of the audio file (without performing speech recognition on the audio file) and to determine a priority for each of the second type of audio files. The query filter may be further configured to send, to a server capable of performing speech recognition processing, one or more of the second type of audio files based on the determined priority of the audio file. An example second type of audio file may comprise the voice command "show me all of the movies in which Harrison Ford is an actor." These audio files may be harder to recognize, and speech recognition may be necessary to process those audio files in order to recognize what was uttered.

Figure 1:
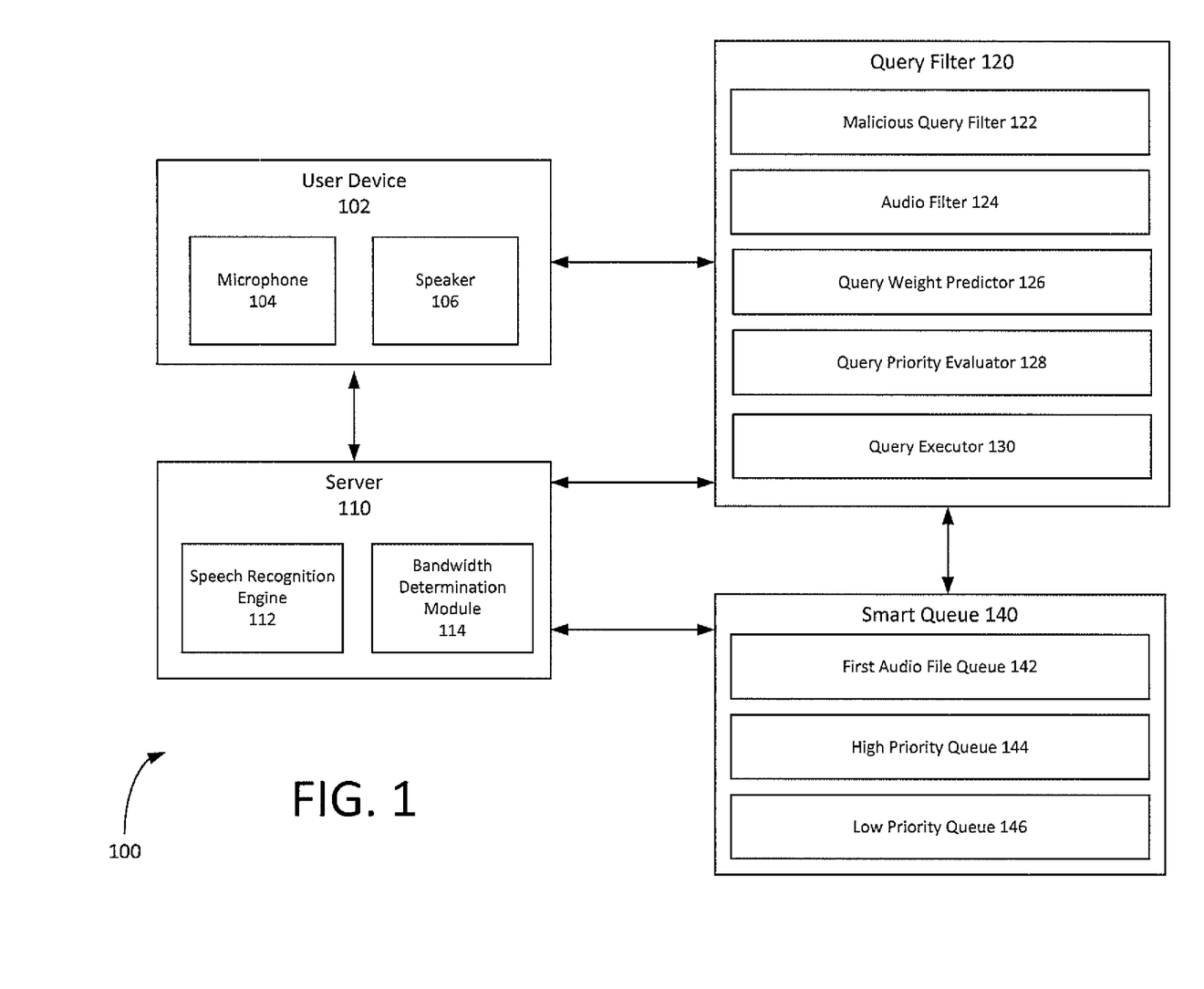
FIG. 1 shows a block diagram of an exemplary system in accordance with aspects of the disclosure.

FIG. 1 shows an exemplary system 100 by which a query filter, such as query filter 120, may be configured to filter audio files based on one or more characteristics of the audio files in order to improve the efficiency of a speech recognition engine, such as speech recognition engine 110. The system 100 may comprise a user device 102, a server 110, a query filter 120 and a smart queue 140. The user device 102 in may be configured to receive voice queries via a microphone, such as microphone 104. The user device 102 may further comprise a speaker, such as speaker 106. The speaker 106 may be configured to output audio in response to receipt of the voice query. For example, a voice query may be received through the microphone 104 comprising an utterance such as "what is the current temperature." In response to the voice query, the user device 102 through the speaker 106 may output a response such as "the current temperature is seventy-six degrees."

The server 110 may be any server capable of performing speech recognition processing and may comprise a speech recognition engine 112 and a bandwidth determination module 114. The speech recognition engine 112 may be configured to perform speech recognition processing, such as automated speech recognition processing. The speech recognition engine 112 may comprise, for example, one or more of a speech capture module, a digital signal processor (DSP) module, a preprocessed signal storage module, a reference speech pattern module and a pattern matching algorithm module. Speech recognition may be done in a variety of ways and at different levels of complexity, for example, using one or more of pattern matching, pattern and feature analysis, and language modeling and statistical analysis, as discussed further herein. However, it is understood that any type of speech recognition may be used, and the examples provided herein are not intended to limit the capabilities of the server 110.

Pattern matching may comprise recognizing each word in its entirety and employing a pattern matching algorithm to match a limited number of words with stored reference speech patterns. An example implementation of pattern patching is a computerized switchboard. For example, a person who calls a bank may encounter an automated message instructing the user to say "one" for account balance, "two" for credit card information, or "three" to speak to a customer representative. In this example, the stored reference speech patterns may comprise multiple reference speech patterns for the words "one" "two" and "three." Thus, the computer analyzing the speech may not have to do any sentence parsing or any understanding of syntax. Instead, the entire chunk of sound may be compared to similar stored patterns in the memory.

Pattern and feature analysis may comprise breaking each word into bits and recognizing the bits from key features, for example, the vowels contained in the word. For example, pattern and feature analysis may comprise digitizing the sound using an analog to digital converter (A/D converter). The digital data may then be converted into a spectrogram, which is a graph showing how the component frequencies of the sound change in intensity over time. This may be done, for example, using a Fast Fourier Transform (FFT). The spectrogram may be broken into a plurality overlapping acoustic frames. These frames may be digitally processed in various ways and analyzed to find the components of speech they contain. The components may then be compared to a phonetic dictionary, such as one found in stored patterns in the memory.

Language modeling and statistical analysis is a more sophisticated speech recognition method in which knowledge of grammar and the probability of certain words or sounds following one from another is used to speed up recognition and improve accuracy. For example, complex voice recognition systems may comprise a vocabulary of over 50,000 words. Language models may be used to give context to words, for example, by analyzing the words proceeding and following the word in order to interpret different meanings the word may have. Language modeling and statistical analysis may be used to train a speech recognition system in order to improve recognition of words based on different pronunciations.

The bandwidth determination module 114 may be configured to determine a bandwidth of the server 110. The bandwidth of the server 110 may represent the amount of audio files capable of being processed by the server 110 at a given time. The determined bandwidth may be used by the query filter 120 in determining whether to process the audio file at the query filter 120 or to place the audio file in one or more queues. For example, if the bandwidth associated with the server 110 is below a threshold, the query filter 120 may be configured to process certain types of audio files at the query weight predictor 126. However, if the bandwidth of the server 110 is above the threshold, the query filter 120 may be configured to place the audio file in one or more queues where they may be sent to the server 110 for speech recognition processing.

The query filter 120 may comprise a number of sub-filters configured to filter audio files based on one or more characteristics of the audio files in order to improve the efficiency of the process. For example, some characteristics may include one or more of an audio fingerprint, spectrogram, energy signature, and/or and acoustic features of the audio files. Characteristics can relate to an entire video file or one or more portions thereof, and can comprise summary characteristics for an audio file. A malicious query filter 122 may be configured to check the frequency of the queries received from specific devices. For example, the malicious query filter 122 may maintain a pool of recent queries. If the rate of queries from a specific device is too high, than the audio files corresponding to queries received from that device may be discarded. In one example, the malicious query filter 122 may maintain a list of approved devices, and may allow an unlimited number of audio files corresponding to queries received from one of the approved devices. The malicious query filter 122 may also be configured to validate audio file parameters. For example, audio files that have wrong parameter values may make the system work for an excessive length of time or may produce invalid results (e.g., wrong encoding) may be detected and discarded. Thus, the malicious query filter 122 may be configured to detect and discard invalid queries received from devices, including queries with invalid parameters, abnormal query frequencies, duplicated queries and queries that are likely to be DDoS attacks.

The audio filter 124 may be configured to check the energy signature and acoustic features of an audio file. For example, the audio filter 124 may check to determine if the audio file contains only background noise or excessive background noise such that the query cannot be processed, and may be configured to discard the audio file if it determines that the query cannot be processed. For any audio file that the audio filter 124 detects is not likely to return a valid response, the audio filter 124 may discard the audio file in order to reduce the load on the server 110.

The query weight predictor 126 may be configured to identify audio files that can be processed based on a characteristic of the audio file (without the need for further speech recognition) and to identify other audio files that will require additional speech recognition, such as speech recognition processing in order to be recognized. A first type of audio file, also referred to herein as a "light" audio file, may be capable of being processed based on a characteristic of the audio file, for example, based on an audio fingerprint associated with the audio file that represents one or more characteristics of the audio file. A second type of audio file, also referred to herein as a "heavy" audio file, may require additional speech recognition processing in order to determine the query or message associated with the audio file. In one example, the second type of audio file may require processing by an active speech recognition engine, a natural language processor, etc., which may be available at back-end server. In contrast, the first type of audio file may only require processing by a local server or may be recognized by a local processor. As discussed further herein, the query weight predictor 126 may be configured to process one or more of the first types of audio files at the query weight predictor 126 or, alternatively, may send one or more of the first types of audio files to the server 110 for speech recognition processing, based on, for example, a measure of the current bandwidth of the system. In the example that the query weight predictor 126 sends the first type of query to the server 110, the query weight predictor 126 may send the query directly to the server 110 or may place the query in a first audio file queue, such as first audio file queue 142.

The query weight predictor 126 may determine that an audio file is a first type of audio file, or "light" audio file, based on a set of rules, or a classifier. For example, the query weight predictor 126, or an associated memory and processor, may collect the audio file and may use machine learning to create a set of rules mapping the audio file to a transcription. The set of rules may be referred to herein as a set of model data. During runtime, the query weight predictor 126 may compare the audio file with the filter rules to determine whether the audio file is a light audio file or a heavy audio file. The model data may remain stable and may only need to be updated infrequently, for example, monthly or weekly.

In the example that the query weight predictor 126 processes the first type of audio file based on the characteristic of the audio file, the query weight predictor 126 may be configured to determine an audio fingerprint based on the audio file and to compare the audio fingerprint based on the audio file to a number of stored audio fingerprints, each of the stored audio fingerprints being associated with a stored audio transcription. The query filter 120 may determine an audio fingerprint based on the audio file using an audio fingerprinting algorithm. The audio fingerprint may be a unique audio characteristic associated with the received audio file. For example, the audio fingerprint may comprise a randomly selected portion of the audio file, such as a sampling of the audio file captured once every 100 milliseconds. This unique portion of the audio file may be used to identify the audio file at some point in the future, as discussed further herein.

In one embodiment, determining an audio fingerprint based on the audio file may comprise the following steps: (1) background noise reduction and audio-sampling; (2) feature extraction based on a spectrogram of the audio file; (3) hash code generation and (4) hash code comparison based on a distance metric, such as Levenshtein distance metric. In one aspect, the hash code may be generated using a deep learning based approach, such as Semantic Hashing and Restricted Boltzmann Machine, in order to automatically learn the features and hash codes simultaneously from the spectrum of the audio files. For example, a deep neural network may be used to encode multiple utterances of the same transcription, such that the cache 120 may learn the feature representation layer-by-layer.

The query weight predictor 126 may determine whether the audio fingerprint based on the audio file corresponds to one of the plurality of audio fingerprints stored in the query filter 120. The stored audio transcriptions associated with the stored audio fingerprints may have been previously received from a server capable of performing speech recognition, such as the server 110, after having performed speech recognition on audio files from which the stored audio fingerprints were generated. The plurality of audio transcriptions stored in the query filter 120 may correspond to popular voice queries received at the user device 102 associated with the query filter 120. In the example that the audio file corresponds to the voice query "tune to CNBC," determining whether the audio fingerprint corresponds to one of a plurality of audio fingerprints stored in the cache may comprise comparing the audio fingerprint generated from the received audio file with each of the audio fingerprints and associated transcriptions stored in the cache and determining that a particular one of the stored fingerprints matches the fingerprint of the received audio file. In that case, the audio transcription associated with the matching stored fingerprint in the cache may be selected as the audio transcription for the received audio file—without having to perform speech recognition on the received audio file.

The plurality of audio fingerprints and associated transcriptions stored in the query filter 120 may correspond to popular voice queries received at a user device, such as user device 102. For example, the query filter 120 m
ay store the audio fingerprints and associated transcriptions associated with the top fifty most recent popular voice queries received at the user device 102. These top fifty most recent popular voice queries may cover about 25% of the total number of voice queries received at the user device 102.

In response to determining that the audio fingerprint corresponds to a given one of the stored audio fingerprints, the query weight predictor 126 may be configured to process the audio file to "recognize" what the user uttered without performing speech recognition. Processing the audio file may comprise selecting the stored audio transcription associated with the matching audio fingerprint in the cache 120 and returning that stored audio transcription to the user device as a response to the voice query.

In one example, in response to determining that the audio fingerprint does not correspond to a stored audio fingerprint, the audio file may be sent to a speech recognition engine for processing using speech recognition methods. For example, the audio file may be sent from the query weight predictor 126 to the server 110 in response to determining that the audio fingerprint does not correspond to a stored audio fingerprint. In response to sending the audio file to the server 110, an audio transcription determined from speech recognition performed on the audio file may be received from server 110. The audio transcription received from the server 110 may be stored in the query filter 120. The received audio transcription may be used by the query weight predictor 126 in responding to the voice query received at the user device 102. In addition, the audio transcription may be stored in the query filter 120 and may be used, for example, in "training" the data stored in the query filter 120. Thus, the audio transcription and an audio fingerprint generated from that same audio file may be added to the query filter 120 and, next time an audio file is received at the query filter 120 for processing, an audio fingerprint based on the audio file may be compared with the stored audio fingerprint and associated transcription to determine if there is a match.

The query priority evaluator 128 may be configured to determine a priority for each of the audio files that are not capable of being processed based on a characteristic of the audio file alone (i.e., audio files for which speech recognition has been determined to be necessary). In one example, the query priority evaluator 128 may be configured to determine a priority for each of the second type of audio files based on a potential revenue of the query associated with the audio file. For example, the query priority evaluator 128 may evaluate the possible revenue impact of each query following a specific rule. If a query has a high revenue impact, it may be placed in a high priority queue, such as high priority queue 144. In contrast, if a query has a low revenue impact, it may be placed in a low priority queue, such as low priority queue 146. Some of the evaluation policies may include, for example, that long streaming delay queries may be placed in the low priority queue while VIP queries (e.g., queries received from a VIP subscriber) may be placed in the high priority queue. In one example, the query priority evaluator 128 may determine that there is no revenue associated with a particular audio file (e.g., due to streaming latencies) and may discard the audio file. However, it is understood that the query priority evaluator 128 may determine a priority of the audio file based on any number of characteristics of the audio file.

The query executor 130 may be configured to process the audio file corresponding to the voice query. For example, the query executor 130 may retrieve the audio file from a given one of the plurality of queues based on a priority policy and may forward the audio file to the server 110. For example, the query executor may be configured to send audio files from at least one of the first audio file queue 142, the high priority queue 144 and the low priority queue 146. In one example, the query executor 130 may send to the server 110 each of the audio files from the first audio file queue 142, and may send to the server 110 audio files from the high priority queue 144 more frequently than it sends audio files from the low priority queue 146. The query executor 130 may be further configured to determine if an audio file has been in any of the first audio file queue 142, the high priority queue 144 and/or the low priority queue 146 for longer than a predetermined time period and, based on this determination, may be configured to delete one or more of the audio files. For example, the query executor 130 may determine to delete any audio files in any of the queues if they have been in there longer than ten seconds. Additionally or alternatively, the query executor 130 may have different rules depending on the type of queue. For example, audio files in the high priority queue 144 may be deleted after twenty seconds while audio files in the low priority queue 146 may be deleted after ten seconds.

Figure 2:
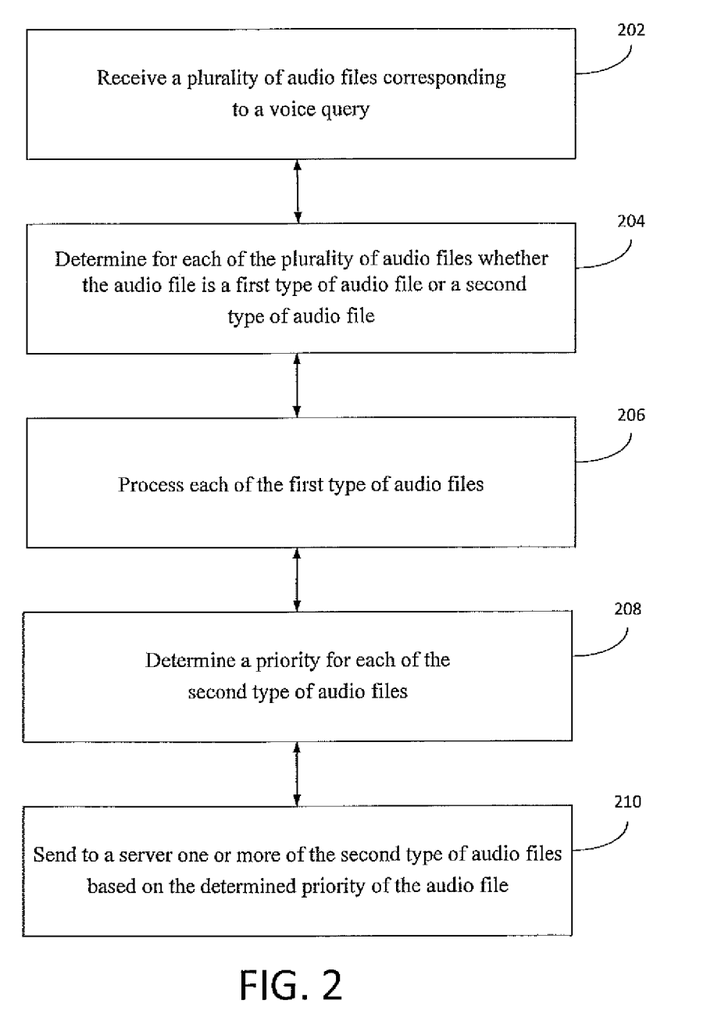
FIG. 2 shows a flow chart of an exemplary method in accordance with aspects of the disclosure.

FIG. 2 illustrates an example method 200 for filtering audio files. At step 202, one or more audio files may be received. Each of the plurality of audio files may correspond to a voice query. The audio files may be received, for example, at the query filter 120 from the user device 102. The user device 102 may be configured to send the audio file to the query filter 120 in response to receipt of the corresponding voice query at the user device 102. In one example, the voice query may comprise a voice command, such as the voice command "tune to CNBC."

At step 204, it may be determined, for each of the plurality of audio files, whether the audio file is a first type of audio file or a second type of audio file. A first type of audio file may be capable of being processed to recognize the voice query based on a characteristic of the audio file and without performing speech recognition. For example, as discussed herein, the query filter 120 may be configured to generate an audio fingerprint representing one or more characteristics of the first type of audio file and to compare those characteristics with characteristics of a plurality of stored audio fingerprints, each of the stored audio fingerprints being associated with a stored audio transcription. Thus, determining that the audio file is a first type of audio file may comprise determining that the audio file maps to a stored transcription. In one example, each of the first type of audio files may correspond to a tuning request. In contrast, a second type of audio file may require speech recognition processing in order to recognize the voice query associated with the audio file. This determination may be made, for example, based on the complexity of the received audio file or the lack of an audio transcription stored in the query filter 120. For example, the second type of audio file may correspond to one that represents a more complex voice query, such as "show me all of the movies in which Harrison Ford is an actor."

At step 206, each of the first type of audio files may be processed. Processing a first type of audio file may comprise generating a response to the voice query associated with the audio file based on the stored audio transcription. As discussed herein, an example voice query may comprise the voice command "tune to CNBC" spoken by a user of the user device 102. In this example, processing the first type of audio file may comprise determining an audio fingerprint based on the voice command "tune to CNBC," comparing the audio fingerprint to a plurality of stored audio fingerprints and associated audio transcriptions, and determining that a particular one of the stored audio fingerprints and its associated audio transcription also correspond to the voice query "tune to CNBC." Processing the audio file may comprise generating and sending a response to the user device 102, based on the audio transcription, to communicate with the nearest set-top box to change the channel to CNBC.

At step 208, a priority may be determined for each of the second type of audio files. Determining a priority for each of the second type of audio files may comprise determining a potential revenue associated with the audio file. Thus, audio files with a high potential revenue may be given a high priority, while audio files with a low potential revenue may be given a low priority. In one example, the query filter 120 may be configured to classify the audio files based on the determined priority into a number of queues. Alternatively, the query filter 120 may be configured to sort each of the audio files in a single list based on their priorities such that each of the second type of audio files may be send to the server 110 based on their determined priority. It is understood that this step may be optional. For example, the second type of audio files may be sent to the server 110 without determining a priority of the one or more second types of audio files.

At step 210, one or more of the second type of audio files may be sent to the server based on the determined priority of the audio files. For example, if the query filter places the audio files in a plurality of queues, the query filter 120 may be configured to send audio files from one of the queues for speech recognition processing more often than it send files from a second one of the queues. In the example that the query filter sorts each of the second type of audio files based on priority, the query filter 120 may be configured to send to the server 110 one or more of the second type of audio files based on the determined priority of the audio files. The server 110 may be configured to perform speech recognition processing on the received audio files.

In one example, a bandwidth associated with the server 110 may be determined. The determined bandwidth may be compared with a threshold bandwidth. In response to determining that the bandwidth of the server is less than the predetermined threshold, the query filter 120 may be configured to generate a response to one or more of the first type of audio files based on the corresponding voice query, for example, using an audio fingerprint associated with the audio file. In contrast, in response to determining that the bandwidth of the server is greater than the predetermined threshold, the query filter may send, to the server 110, one or more of the first type of audio files for speech recognition processing. Thus, even if the audio file is a first type of audio file that is able to be processed without speech recognition, the audio file may still be sent to the server 110 if the server bandwidth of is above a threshold.

The query filter 120 may be configured to delete a given one of the audio files in response to determining that the audio file has been stored for longer than a predetermined time period. For example, the query filter 120 may be configured to delete or discard all received audio files if they have gone unanswered for more than ten seconds. In one example, the query filter 120 may set different lengths of time for deletion based on the priority of the audio file. For example, high priority audio files may be deleted after twenty seconds of no response and low priority audio files may be deleted after ten seconds of no response.

Figure 3:
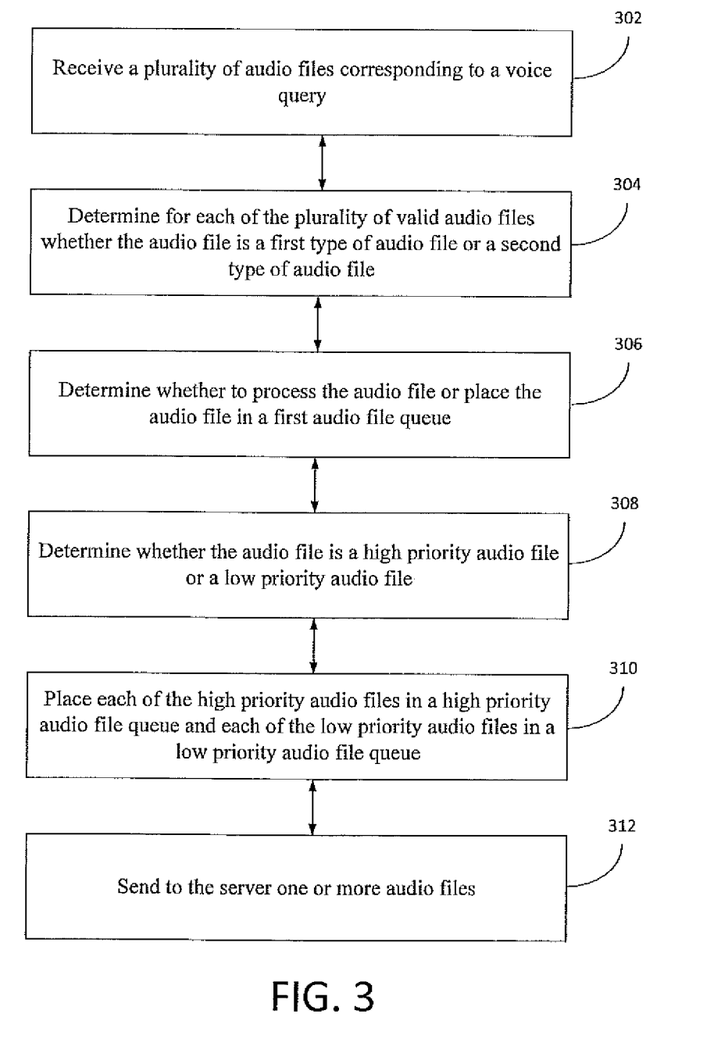
FIG. 3 shows a flow chart of an exemplary method in accordance with aspects of the disclosure.

FIG. 3 illustrates an exemplary method 300 for filtering audio files received at a query filter, such as query filter 120. At step 302, a plurality of audio files may be received. Each of the plurality of audio files may correspond to a voice query. The audio files may be received, for example, at the query filter 120 from the user device 102. The user device 102 may be configured to send the audio file to the query filter 120 in response to receipt of the corresponding voice query at the user device 102. In one example, the voice query may comprise a voice command, such as the voice command "tune to CNBC."

At step 304, it may be determined, for each of the plurality of audio files, whether the audio file is a first type of audio file or a second type of audio file. A first type of audio file may be capable of being processed to recognize the voice query based on a characteristic of the audio file and without performing speech recognition. For example, as discussed herein, the query filter 120 may be configured to generate an audio fingerprint representing one or more characteristics of the first type of audio file and to compare those characteristics with characteristics of a plurality of stored audio fingerprints, each of the stored audio fingerprints being associated with a stored audio transcription. Thus, determining that the audio file is a first type of audio file may comprise determining that the audio file maps to a stored transcription. In one example, each of the first type of audio files may correspond to a tuning request. In contrast, a second type of audio file may require speech recognition processing in order to recognize the voice query associated with the audio file. This determination may be made, for example, based on the complexity of the received audio file or the lack of an audio transcription stored in the query filter 120.

At step 306, it may be determined, for each of the first type of audio files, whether to process the audio file or place the audio file in a first audio file queue. Processing a first type of audio file may comprise generating a response to the voice query associated with the audio file based on a characteristic of the audio file, for example, based on an audio fingerprint associated with the audio file that represents one or more characteristics of the audio file. As discussed herein, an example voice query may comprise the voice command "tune to CNBC" spoken by a user of the user device 102. In this example, processing the first type of audio file may comprise determining an audio fingerprint based on the voice command "tune to CNBC," comparing the audio fingerprint to a plurality of stored audio fingerprints and associated audio transcriptions, and determining that a particular one of the stored audio fingerprints and its associated audio transcription also correspond to the voice query "tune to CNBC." Processing the audio file may comprise generating and sending a response to the user device 102, based on the audio transcription, to communicate with the nearest set-top box to change the channel to CNBC.

In one example, a bandwidth associated with the server 110 may be determined. The determined bandwidth may be compared with a threshold bandwidth. In response to determining that the bandwidth of the server 110 is less than the predetermined threshold, the query filter 120 may be configured to generate a response to one or more of the first type of audio files based on the corresponding voice query, for example, using an audio fingerprint associated with the audio file. In contrast, in response to determining that the bandwidth of the server 110 is greater than the predetermined threshold, the query filter may place one or more of the first type of audio files in the first audio file queue.

At step 308, a priority may be determined for each of the second type of audio files. Determining a priority for each of the second type of audio files may comprise determining a potential revenue associated with the audio file. Thus, audio files with a high potential revenue may be given a high priority, while audio files with a low potential revenue may be given a low priority. However, it is understood that the priority of a second type of audio file may be based on any number of factors.

At step 310, each of the second type of audio files may be placed in a queue depending on the determined priority associated with the given audio file. For example, each of the high priority audio files may be placed in a high priority queue, such as high priority queue 144, and each of the low priority audio files may be places in a low priority queue, such as low priority audio file queue 146. While FIG. 1 illustrates a smart queue 140 comprising a high priority queue 144 and a low priority queue 146, it is understood that the smart queue 140 may comprise any number of queues.

At step 312, one or more audio files from at least one of the first audio file queue 142, the high priority queue 144 and low priority queue 146 may be sent to a server capable of performing speech recognition processing, such as the server 110. The audio files may be sent to the server 110 based, for example, on the determined priority of the audio files. In one example, each of the audio files from the first audio file queue 142 may be sent to the server 110, and one or more audio files from the high priority queue 144 may be sent more frequently than audio files from the low priority queue 146. The audio files received from the first audio file queue 142 may be processed by the server 110 upon receipt of the audio files. The audio files received from the first audio file queue may not require as much processing power as the audio files received from either the high priority queue 144 or the low priority queue 146 and thus they may be given priority. The server 110 may be configured to process audio files received from the high priority queue 144 prior to processing audio files received from the low priority queue 146.

In one example, the query filter 120 may determine, for each of the plurality of audio files, whether the audio file is a valid audio file or an invalid audio file. For example, at least one of the malicious query filter 122 or the audio filter 124 may determine whether a given audio file is a valid audio file or an invalid audio file. The query filter 120 may be configured to delete, based on determining that a given audio file is an invalid audio file, the given audio file. Determining that an audio file is invalid may comprise at least one of determining that the audio file comprises invalid parameters, determining that the audio file is a duplicate, determining that processing of the audio file will not return a valid result, and determining that the audio file is the result of a DDoS attack. In one example, audio files determined to be invalid may be stored in the cache 120. The cache 120 may determine that an audio file is invalid by comparing the received audio file with one or more of the invalid audio files stored in the cache 120 using, for example, cross-correlation. Additionally or alternatively, determining that an audio file is invalid may comprise a frequency-based algorithm. For example, if the cache 120 receives a large number of requests from the same device, the cache 120 may determine that all audio files received from that device are invalid.

The query filter 120 may be configured to delete a given one of the audio files in response to determining that the audio file has been stored for longer than a predetermined time period. For example, the query filter 120 may be configured to delete or discard all received audio files if they have gone unanswered for more than ten seconds. In one example, the query filter 120 may set different lengths of time for deletion based on the priority of the audio file. For example, high priority audio files in the high priority queue 144 may be deleted after twenty seconds of no response and low priority audio files in the low priority queue 146 may be deleted after ten seconds of no response.

Figure 4:
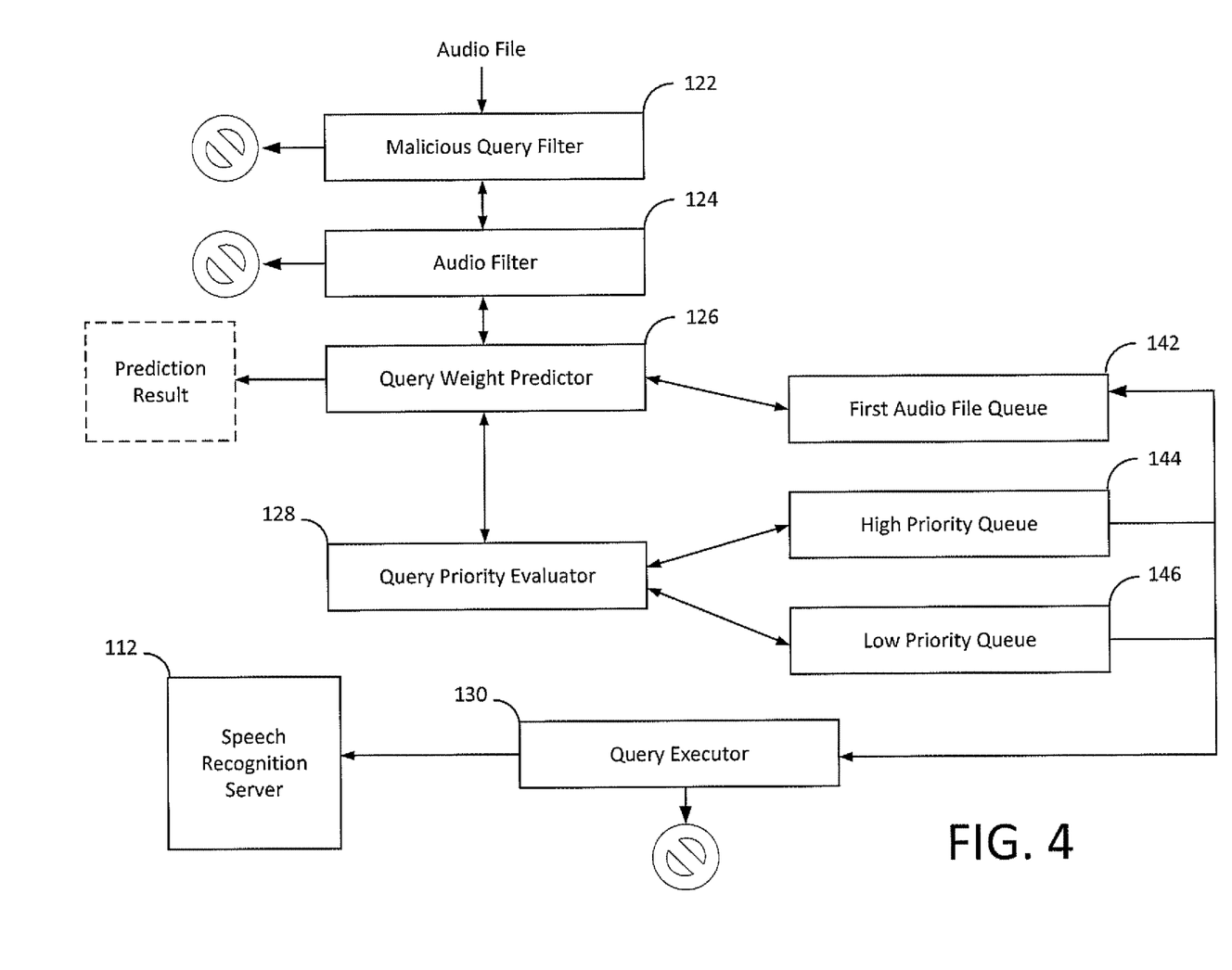
FIG. 4 shows an example implementation of a query filter and one or more smart queues.

FIG. 4 illustrates an example implementation of the smart query filter 120 illustrated in FIG. 1. While each of the filters illustrated in FIG. 4 appear to process a received audio file sequentially, it is understood that one or more of the filters may operate in parallel. In addition, it is understood that the filters may appear in any order and are not limited to the order illustrated in FIG. 4. For example, an audio file may be received at a malicious query filter, such as malicious query filter 122. The malicious query filter 122 may be configured to check the frequency of the queries received from specific devices. For example, the malicious query filter 122 may maintain a pool of recent queries. If the rate of queries from a specific device is too high, than the audio files corresponding to queries received from that device may be discarded. The malicious query filter 122 may also be configured to validate the audio file parameters. For example, audio files that have wrong parameter values may make the system work for an excessive length of time or may produce invalid results (e.g., wrong encoding) may be detected and discarded. However, audio files that are not filtered by the malicious query filter 122 may be sent to the audio filter 124 for further processing.

The audio filter 124 may be configured to check the energy signature and acoustic features of an audio file. For example, the audio filter 124 may check to determine if the audio file contains only background noise or excessive background noise such that the query cannot be processed, and may be configured to discard the audio file if it determines that the query cannot be processed. For any audio file that the audio filter 124 detects is not likely to return a valid response, the audio filter 124 may discard the audio file in order to reduce the load on the server 110. However, if the audio filter 124 determines that the audio file is capable of being processed, then it may send the audio file to a query weight predictor, such as query weight predictor 126.

The query weight predictor 126 may be configured to identify audio files that can be processed to determine the query based on a characteristic of the audio file, without performing speech recognition, and to identify audio files that require speech recognition processing in order to be processed. For example, a first type of audio file, also referred to herein as a "light" audio file, may be capable of being processed based on a characteristic of the audio file, for example, based on an audio fingerprint associated with the audio file that represents one or more characteristics of the audio file. A second type of audio file, also referred to herein as a "heavy" audio file, may require speech recognition processing in order to determine the query associated with the audio file. The query weight predictor 126 may be configured to process the first types of audio files at the query weight predictor 126 and output a prediction result. Alternatively, the query weight predictor 126 may place the first type of audio files in the first audio file queue 142 where they may be later sent to the server 110 for processing. In addition, the query weight predictor may be configured to send each of the second type of audio files to the query priority evaluator 128.

The query priority evaluator 128 may be configured to determine a priority for each of the second type of audio files received from the query weight predictor 126. In one example, the query priority evaluator 128 may be configured to determine a priority for each of the second type of audio files based on a potential revenue of the query associated with the audio file. For example, if a query has a high revenue impact, it may be placed in a high priority queue, such as high priority queue 144. In contrast, if a query has a low revenue impact, it may be placed in a low priority queue, such as low priority queue 146. Some of the evaluation policies may include, for example, that long streaming delay queries may be placed in the low priority queue, VIP and critical health check queries be placed in the high priority queue, and special demo and sample requests be placed in the high priority queue.

The query executor 130 may be configured to retrieve one or more audio files from the plurality of queues following a priority policy and may forward the audio files to the server 110. For example, the query executor 130 may be configured to send audio files from at least one of the first audio file queue 142, the high priority queue 144 and the low priority queue 146. In one example, the query executor 130 may send to the server 110 each of the audio files from the first audio file queue 142, and may send to the server 110 audio files from the high priority queue 144 more frequently than it sends audio files from the low priority queue 146. The query executor 130 may be further configured to determine if an audio file has been in any of the first audio file queue 142, the high priority queue 144 and/or the low priority queue 146 for longer than a predetermined time period and, based on this determination, may be configured to delete one or more of the audio files.

Figure 5:
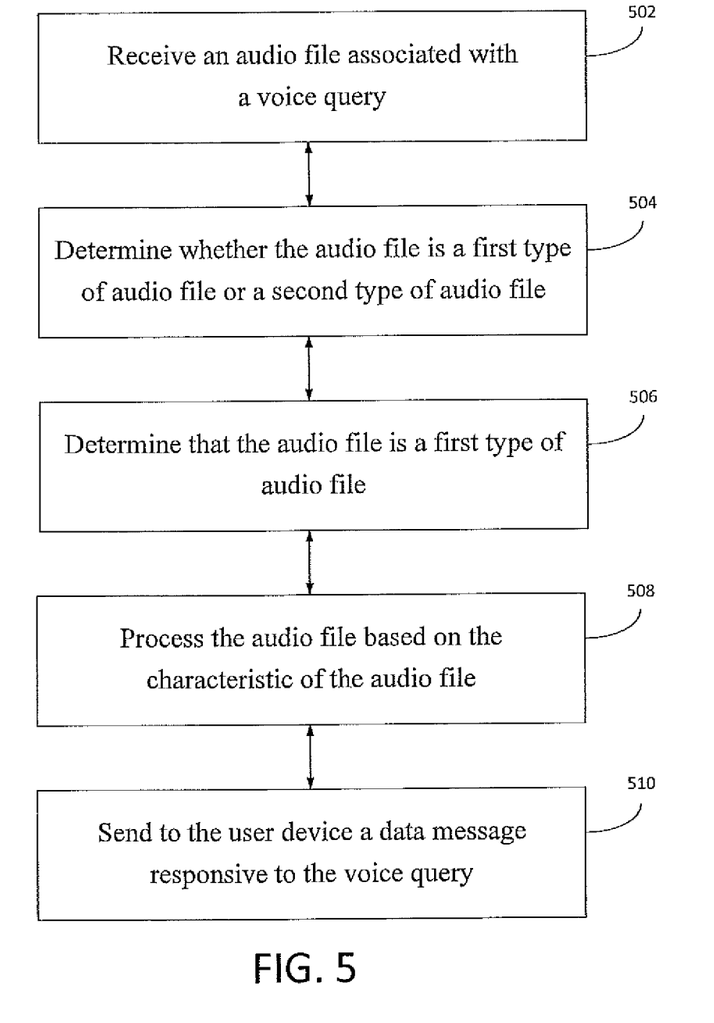
FIG. 5 shows a flow chart of an exemplary method in accordance with aspects of the disclosure.

FIG. 5 illustrates an example method 500 according to an embodiment of the invention. As shown at step 502, an audio file corresponding to a voice query may be sent to a processing device. The processing device may be, for example, the query filter 120 illustrated in FIG. 1. The audio file may be sent from a user device, such as user device 102 illustrated in FIG. 1, in response to receipt of the voice query at the user device from a user of the user device. The voice query may be, for example, a spoken command to the user device to perform some action, a spoken request to view or play some particular content, a spoken request to search for certain content or information based on search criteria, or any other spoken request or command that may be uttered by a user of the user device.

At step 504, the processing device may determine whether the audio file is a first type of audio file or a second type of audio file. A first type of audio file may be capable of being processed to recognize the voice query based on a characteristic of the audio file and without performing speech recognition. For example, as discussed herein, the query filter 120 may be configured to generate an audio fingerprint representing one or more characteristics of the first type of audio file and to compare those characteristics with characteristics of a plurality of stored audio fingerprints, each of the stored audio fingerprints being associated with a stored audio transcription. Thus, determining that the audio file is a first type of audio file may comprise determining that the audio file maps to a stored transcription. In contrast, a second type of audio file may require speech recognition processing in order to recognize the voice query associated with the audio file. This determination may be made, for example, based on the complexity of the received audio file or the lack of an audio transcription stored in the query filter 120.

At step 506, the processing device may determine that the audio file is a first type of audio file. The processing device may determine that the audio file is a first type of audio file by creating an audio fingerprint based on the audio file and comparing the audio fingerprint to one or more stored audio fingerprints. The one or more stored audio fingerprints may be associated with one or more previously received voice queries. For example, the received voice query may comprise the voice command "tune to channel five." The processing device may be configured to create an audio fingerprint of the received voice command, such as by sampling the voice command.

At step 508, the processing device may process the audio file based on the characteristic of the audio file. For example, the processing device may be configured to determine that the created audio fingerprint corresponds to a given one of the stored audio fingerprints. The processing device may determine that the audio fingerprint corresponding to the received voice command "tune to channel five" corresponds to another audio fingerprint associated with a received voice query for the same voice command.

At step 510, the processing device may send to the user device a data message responsive to the voice query. The processing device may send to the user device the response to the voice query associated with the stored audio fingerprint. The processing device may determine to send to the user device an indication to tune to channel five.

Figure 6:
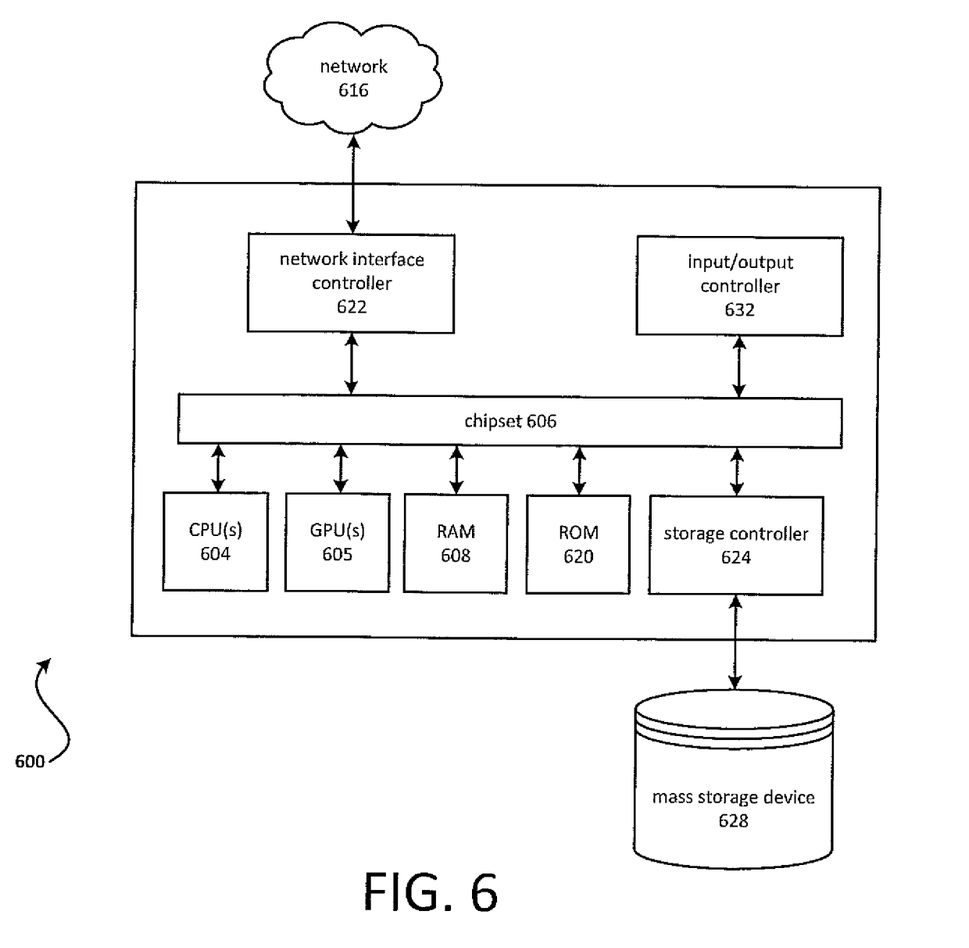
FIG. 6 shows a block diagram of an exemplary computing device.

FIG. 6 depicts a computing device that may be used in various aspects, such as the servers, modules, and/or devices depicted in FIG. 1. With regard to the example architecture of FIG. 1, the user device 102, server 120, and/or the audio device 140 may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2, 3 and 5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 2, 3 and 5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A system comprising:
   one or more user devices; and
   a computing device configured to:
      receive a plurality of audio files from the one or more user devices, each of the plurality of audio files corresponding to a voice query;
      determine a first characteristic of each of the plurality of audio files;
      determine, based on the first characteristic of each of the plurality of audio files, whether the audio file is a first type of audio file or a second type of audio file, wherein the first type of audio file is associated with a voice query that is recognized, and the second type of audio file is associated with a voice query that is not recognized;
      process one or more audio files of the first type;
      determine a second characteristic of each audio file of the second type, the second characteristic being different from the first characteristic;
      prioritize, based on the second characteristic of each audio file of the second type, each audio file of the second type relative to one another; and
      send, based on the priority of the one or more audio files of the second type, one or more audio files of the second type for speech recognition processing to recognize one or more voice queries associated with the one or more audio files of the second type.

2. The system of claim 1, wherein the computing device is configured to:
   determine the first characteristic of each of the plurality of audio files by creating an audio fingerprint of each of the plurality of audio files; and
   determine whether the audio file is the first type of audio file or the second type of audio file by comparing each audio fingerprint to one or more stored audio fingerprints.

3. The system of claim 2, wherein the one or more stored audio fingerprints are associated with one or more previously received voice queries.

4. The system of claim 2, wherein the computing device is configured to create the audio fingerprint of each of the plurality of audio files by creating the audio fingerprint of a randomly selected portion of each audio file or a sampling of each audio file.

5. The system of claim 1, wherein the computing device is further configured to:
   determine that one of the plurality of audio files has been stored for longer than a predetermined time period; and
   delete the one audio file in response to the determination that the one audio file has been stored for longer than the predetermined time period.

6. The system of claim 1, wherein the computing device is further configured to delete one or more audio files of the second type based on the priority of the audio files of the second type.

7. The system of claim 1, wherein the computing device is configured to process the one or more audio files of the first type by sending a data message in response to the voice query associated with the audio file.

8. The system of claim 1, wherein the second characteristic is at least one of a potential revenue associated with each audio file of the second type, a category of a user associated with each audio file of the second type, or an indication of a complexity of each audio file of the second type.

9. A system comprising:
   one or more user devices; and
   a computing device configured to:
      receive a plurality of audio files from the one or more user devices, each of the plurality of audio files corresponding to a voice query;
      determine a first characteristic of each of the plurality of audio files;
      determine, based on the first characteristic of each of the plurality of audio files, whether the audio file is a first type of audio file or a second type of audio file, wherein the first type of audio file is associated with a voice query that is recognized, and the second type of audio file requires processing to recognize the voice query;
      determine, for each audio file of the first type, whether to process the audio file or to place the audio file in a first audio file queue;
      determine a second characteristic of each audio file of the second type, the second characteristic being different from the first characteristic;
      determine, based on the second characteristic of each audio file of the second type, whether the audio file is a high priority audio file or a low priority audio file;
      place each of the high priority audio files in a high priority queue and each of the low priority audio files in a low priority queue; and
      speech recognition process one or more audio files from at least one of the first audio file queue, the high priority queue, and the low priority queue to recognize one or more voice queries associated with the one or more audio files.

10. The system of claim 9, wherein the computing device is configured to:
    determine the first characteristic of each of the plurality of audio files by creating an audio fingerprint of each of the plurality of audio files; and
    determine whether the audio file is the first type of audio file or the second type of audio file by comparing each audio fingerprint to one or more stored audio fingerprints.

11. The system of claim 10, wherein the one or more stored audio fingerprints are associated with one or more previously received voice queries.

12. The system of claim 9, wherein the computing device is further configured to:
    determine, for each of the plurality of audio files, whether the audio file is a valid audio file or an invalid audio file; and delete, based on the determination that the audio file is an invalid audio file, the audio file.

13. The system of claim 12, wherein the computing device is configured to determine that the audio file is an invalid audio file by at least one of determining that the audio file comprises invalid parameters, determining that the audio file is a duplicate, determining that processing of the audio file will not return a valid result, or determining that the audio file is the result of a DDoS attack.

14. The system of claim 9, wherein the computing device is further configured to generate a response to the associated voice query of the one or more audio files.

15. The system of claim 9, wherein the computing device is configured to determine whether to process the audio file or to place the audio file in the first audio file queue by:
   determining a bandwidth capacity;
   comparing the bandwidth capacity to a threshold; and
      in response to determining that the bandwidth capacity is below the threshold, processing the audio file of the first type; or
      in response to determining that the bandwidth exceeds the threshold, placing the audio file of the first type in the first audio file queue.

16. The system of claim 9, wherein the computing device is configured to speech recognition process the one or more audio files from at least one of the first audio file queue, the high priority queue, and the low priority queue by speech recognition processing the one or more audio files from the high priority queue more frequently than one or more audio files from the low priority queue.

17. The system of claim 9, wherein the computing device is configured to process the one or more audio files of the first type by sending a data message in response to the voice query associated with the audio file.

18. The system of claim 9, wherein the second characteristic is at least one of a potential revenue associated with each audio file of the second type, a category of a user associated with each audio file of the second type, or an indication of a complexity of each audio file of the second type.

19. A non-transitory computer-readable medium storing instructions that, when executed by one or more processors, cause:
   receiving a plurality of audio files, each of the plurality of audio files corresponding to a voice query;
   determining a first characteristic of each of the plurality of audio files;
   determining, based on the first characteristic of each of the plurality of audio files, whether the audio file is a first type of audio file or a second type of audio file, wherein the first type of audio file is associated with a voice query that is recognized, and the second type of audio file is associated with a voice query that is not recognized;
   processing one or more audio files of the first type;
   determining a second characteristic of each audio file of the second type, the second characteristic being different from the first characteristic;
   prioritizing, based on the second characteristic of each audio file of the second type, each audio file of the second type relative to one another; and
   sending, based on the priority of the one or more audio files of the second type, one or more audio files of the second type for speech recognition processing to recognize one or more voice queries associated with the one or more audio files of the second type.

20. The non-transitory computer-readable medium of claim 19, wherein the instructions, when executed by the one or more processors, cause:
   determining the first characteristic of each of the plurality of audio files by creating an audio fingerprint of each of the plurality of audio files; and
   determining whether the audio file is the first type of audio file or the second type of audio file by comparing each audio fingerprint to one or more stored audio fingerprints.

21. The non-transitory computer-readable medium of claim 20, wherein the one or more stored audio fingerprints are associated with one or more previously received voice queries.

22. The non-transitory computer-readable medium of claim 20, wherein the instructions, when executed by the one or more processors, cause creating the audio fingerprint of each of the plurality of audio files by creating the audio fingerprint of a randomly selected portion of each audio file or a sampling of each audio file.

23. The non-transitory computer-readable medium of claim 19, wherein the instructions, when executed by the one or more processors, further cause:
   determining that one of the plurality of audio files has been stored for longer than a predetermined time period; and
   deleting the one audio file in response to the determination that the one audio file has been stored for longer than the predetermined time period.

24. The non-transitory computer-readable medium of claim 19, wherein the instructions, when executed by the one or more processors, further cause deleting one or more audio files of the second type based on the priority of the audio files of the second type.

25. The non-transitory computer-readable medium of claim 19, wherein the instructions, when executed by the one or more processors, cause processing the one or more audio files of the first type by sending a data message in response to the voice query associated with the audio file.

26. The non-transitory computer-readable medium of claim 19, wherein the second characteristic is at least one of a potential revenue associated with each audio file of the second type, a category of a user associated with each audio file of the second type, or an indication of a complexity of each audio file of the second type.

27. A non-transitory computer-readable medium storing instructions that, when executed by one or more processors, cause:
   receiving a plurality of audio files, each of the plurality of audio files corresponding to a voice query;
   determining a first characteristic of each of the plurality of audio files;
   determining, based on the first characteristic of each of the plurality of audio files, whether the audio file is a first type of audio file or a second type of audio file, wherein the first type of audio file is associated with a voice query that is recognized, and the second type of audio file requires processing to recognize the voice query;
   determining, for each audio file of the first type, whether to process the audio file or to place the audio file in a first audio file queue;
   determining a second characteristic of each audio file of the second type, the second characteristic being different from the first characteristic;
   determining, based on the second characteristic of each audio file of the second type, whether the audio file is a high priority audio file or a low priority audio file;

placing each of the high priority audio files in a high priority queue and each of the low priority audio files in a low priority queue; and speech recognition processing one or more audio files from at least one of the first audio file queue, the high priority queue, and the low priority queue to recognize one or more voice queries associated with the one or more audio files.

28. The non-transitory computer-readable medium of claim 27, wherein the instructions, when executed by the one or more processors, cause:

determining the first characteristic of each of the plurality of audio files by creating an audio fingerprint of each of the plurality of audio files; and determining whether the audio file is the first type of audio file or the second type of audio file by comparing each audio fingerprint to one or more stored audio fingerprints.

29. The non-transitory computer-readable medium of claim 28, wherein the one or more stored audio fingerprints are associated with one or more previously received voice queries.

30. The non-transitory computer-readable medium of claim 27, wherein the instructions, when executed by the one or more processors, further cause:

determining, for each of the plurality of audio files, whether the audio file is a valid audio file or an invalid audio file; and deleting, based on the determination that the audio file is an invalid audio file, the audio file.

31. The non-transitory computer-readable medium of claim 30, wherein the instructions, when executed by the one or more processors, cause determining that the audio file is an invalid audio file by at least one of determining that the audio file comprises invalid parameters, determining that the audio file is a duplicate, determining that processing of the audio file will not return a valid result, or determining that the audio file is the result of a DDoS attack.

32. The non-transitory computer-readable medium of claim 27, wherein the instructions, when executed by the one or more processors, further cause generating a response to the associated voice query of the one or more audio files.

33. The non-transitory computer-readable medium of claim 27, wherein the instructions, when executed by the one or more processors, cause determining whether to process the audio file or to place the audio file in the first audio file queue by:

determining a bandwidth capacity;

comparing the bandwidth capacity to a threshold; and in response to determining that the bandwidth capacity is below the threshold, processing the audio file of the first type; or in response to determining that the bandwidth exceeds the threshold, placing the audio file of the first type in the first audio file queue.

34. The non-transitory computer-readable medium of claim 27, wherein the instructions, when executed by the one or more processors, cause speech recognition processing the one or more audio files from at least one of the first audio file queue, the high priority queue, and the low priority queue by speech recognition processing the one or more audio files from the high priority queue more frequently than one or more audio files from the low priority queue.

35. The non-transitory computer-readable medium of claim 27, wherein the instructions, when executed by the one or more processors, cause processing the one or more audio files of the first type by sending a data message in response to the voice query associated with the audio file.

36. The non-transitory computer-readable medium of claim 27, wherein the second characteristic is at least one of a potential revenue associated with each audio file of the second type, a category of a user associated with each audio file of the second type, or an indication of a complexity of each audio file of the second type.

* * * * *